(12) United States Patent
Weiss, II et al.

(10) Patent No.: US 9,677,604 B2
(45) Date of Patent: Jun. 13, 2017

(54) BEARING DEVICE WITH SEAL TREATMENT TO REDUCE WATER INGRESS AND METHOD THEREOF

(71) Applicant: Schaeffler Technologies AG & Co. KG, Herzogenaurach (DE)

(72) Inventors: Robert Weiss, II, Sterling Heights, MI (US); Emily Bygrave, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 85 days.

(21) Appl. No.: 14/803,507

(22) Filed: Jul. 20, 2015

(65) Prior Publication Data
US 2016/0047419 A1    Feb. 18, 2016

Related U.S. Application Data

(60) Provisional application No. 62/037,401, filed on Aug. 14, 2014.

(51) Int. Cl.
| | |
|---|---|
| *F16C 33/46* | (2006.01) |
| *F16C 33/58* | (2006.01) |
| *F16C 33/80* | (2006.01) |
| *F16C 19/06* | (2006.01) |
| *F16C 19/16* | (2006.01) |

(Continued)

(52) U.S. Cl.
CPC ............ *F16C 19/06* (2013.01); *F16C 19/163* (2013.01); *F16C 33/805* (2013.01); *F16C 43/02* (2013.01); *F16C 43/04* (2013.01); *F16C 2202/66* (2013.01); *F16C 2223/30* (2013.01)

(58) Field of Classification Search
CPC ........ F16C 19/10; F16C 19/16; F16C 19/163; F16C 33/80; F16C 33/805; F16C 2202/66; F16C 2223/30; F16C 2326/05
See application file for complete search history.

(56) References Cited

U.S. PATENT DOCUMENTS

| 5,664,650 A | 9/1997 | Kammel et al. | |
|---|---|---|---|
| 2011/0293214 A1* | 12/2011 | Houdayer | B60G 15/068 384/606 |
| 2013/0064489 A1* | 3/2013 | Corbett | B60G 15/068 384/607 |

FOREIGN PATENT DOCUMENTS

| CN | 1067100 | 12/1992 |
|---|---|---|
| EP | 0039133 | 11/1981 |

(Continued)

*Primary Examiner* — Phillip A Johnson
(74) *Attorney, Agent, or Firm* — Simpson & Simpson, PLLC

(57) ABSTRACT

A bearing device, including: a first housing including a first interior surface with a first portion and an exterior surface; a second housing including a second interior surface with a second portion and an exterior surface; a bearing assembly including a first ring connected to the first interior surface, a second ring connected to the second interior surface and a rolling element between the rings; a first space between first and second portions of the first and second interior surfaces, respectively and extending from the first and second exterior surface to the bearing assembly; and at least one first layer of a hydrophobic material adhered to and covering at least a first segment of the first portion; or a second segment of the second portion. The first segment includes less than an entirety of the first portion, and the second segment includes less than an entirety of the second portion.

15 Claims, 10 Drawing Sheets

(51) Int. Cl.
   *F16C 43/02*   (2006.01)
   *F16C 43/04*   (2006.01)

(56) References Cited

FOREIGN PATENT DOCUMENTS

| | | |
|---|---|---|
| EP | 0816140 | 1/1998 |
| EP | 1413414 | 4/2004 |
| EP | 2594763 | 5/2013 |
| WO | 2009106469 | 9/2009 |
| WO | 2011012484 | 2/2011 |
| WO | 2012168354 | 12/2012 |

* cited by examiner

Prior Art

Prior Art

BEARING DEVICE WITH SEAL TREATMENT TO REDUCE WATER INGRESS AND METHOD THEREOF

CROSS-REFERENCE TO RELATED APPLICATIONS

This application claims the benefit under 35 U.S.C. §119(e) of U.S. Provisional Patent Application No. 62/037,401, filed Aug. 14, 2014, which application is incorporated herein by reference in its entirety.

TECHNICAL FIELD

The present disclosure relates to a bearing device including a hydrophobic material coating at least respective portions of interior surfaces of housings enclosing a bearing assembly (including at least one rolling element) and connecting the bearing assembly to an exterior of the bearing device

BACKGROUND

FIGS. 9 and 10 are cross-sectional views of respective prior art bearing devices. Bearing device 10 includes housings 12 and 14 and bearing assembly 16 with rings 18 and 20 and at least one rolling element 22 disposed between and at least partially retained by rings 18 and 20. Spaces 24 and 26 extend from an exterior of device 10 to the bearing assembly. Device 10 can be used in a wet environment in which water can travel through spaces 24 and 26 to assembly 16. Water in assembly 16 is detrimental to the function of assembly 16 and can lead to premature failure of assembly 16.

Bearing 10 in FIG. 9 uses a labyrinth arrangement of spaces 24 and 26 to attempt to limit ingress of water into device 10. For example, spaces 24 and 26 follow serpentine paths so that there is no straight line path from an exterior of device 10 to assembly 16. However, the labyrinth arrangement has limited effectiveness as a means of preventing water ingress. Bearing 10 in FIG. 10 uses seal 28 to attempt to limit ingress of water into device 10. However, seal 28 is only partially successful in limiting water ingress.

SUMMARY

According to aspects illustrated herein, there is provided a bearing device, including: a first housing including a first interior surface with a first portion and a first exterior surface; a second housing including a second interior surface with a second portion and a second exterior surface; a bearing assembly including a first ring connected to the first interior surface, a second ring connected to the second interior surface and at least one rolling element disposed between and at least partially retained by the first and second rings; a first space between first and second portions of the first and second interior surfaces, respectively and extending from the first and second exterior surface to the bearing assembly; and at least one first layer of a hydrophobic material adhered to and covering at least a first segment of the first portion; or a second segment of the second portion. The first segment includes less than an entirety of the first portion, and the second segment includes less than an entirety of the second portion.

According to aspects illustrated herein, there is provided a bearing device, including: a first housing including a first interior surface with a first portion and a first exterior surface; a second housing including a second interior surface with a second portion and a second exterior surface; a bearing assembly including a first ring connected to the first surface and a second ring connected to the second surface; and at least one rolling element disposed between and at least partially retained by the first and second rings; a first space between first and second portions of the first and second surfaces, respectively and extending from the first and second exterior surface to the bearing assembly; and at least one first layer of a hydrophobic material adhered to and covering at least a first segment of the first portion or a second segment of the second surface. The first segment includes less than an entirety of the first portion and the second segment includes less than an entirety of the second portion. A first straight line passes through, in order, the first housing, the first space, the second housing, the first space, and the bearing assembly, or the device includes a seal at least partially located in the first space and sealed against the first and second housings.

According to aspects illustrated herein, there is provided a method of proofing a bearing device against ingress of water, including: coating at least a first portion of a first interior surface of a first housing for the bearing device with a first layer of a hydrophobic material; coating at least a second portion of a second interior surface of a second housing for the bearing device with a second layer of the hydrophobic material; fixedly connecting first and second rings for a bearing assembly to the first and second interior surfaces, respectively, the first and second rings partially retaining at least one rolling element; and creating a first space between the first and second interior surfaces, the first space between an exterior of the bearing device and the bearing assembly and at least partially bounded by the first and second portions.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
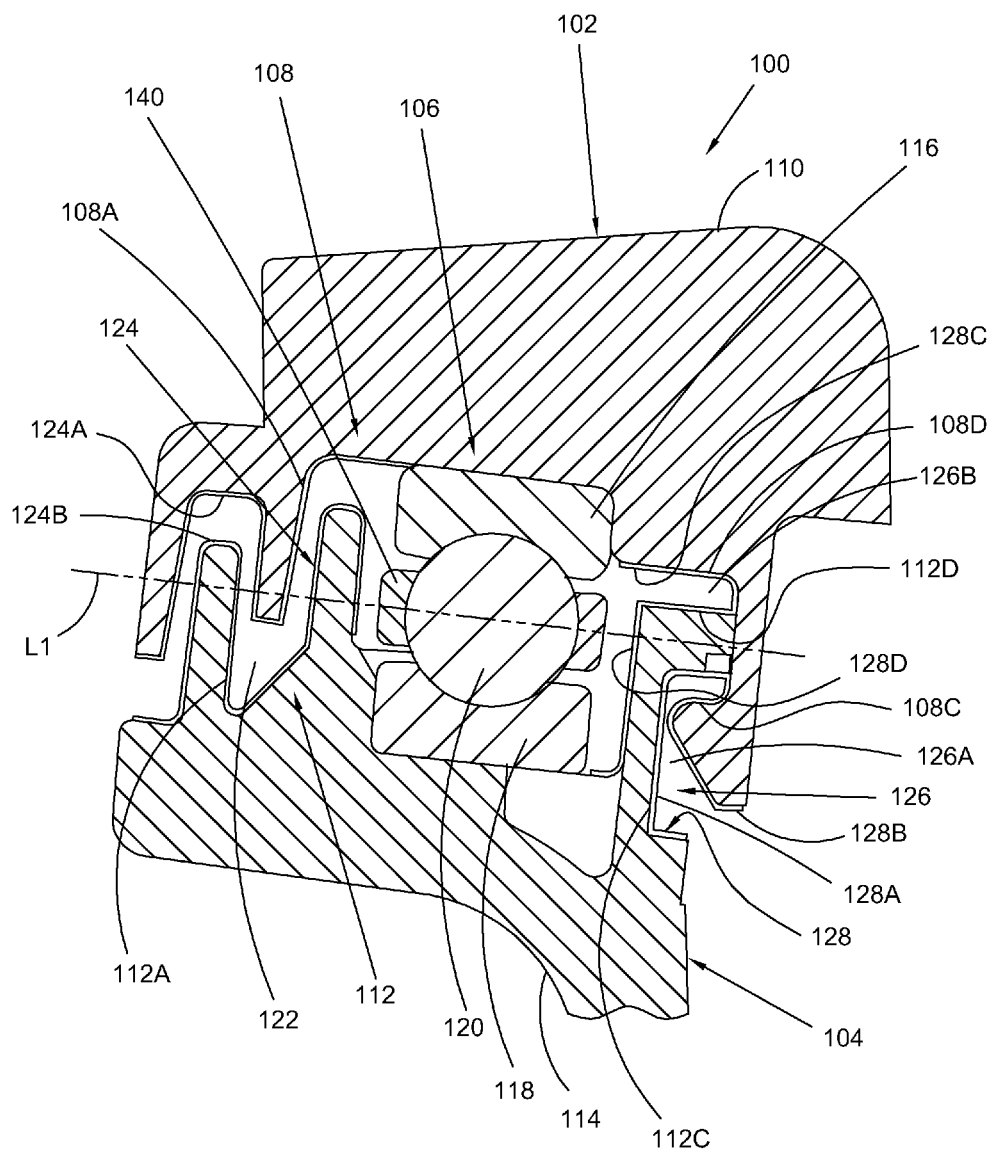
FIG. 1 is a cross-sectional view of a bearing device with full surface treatment to reduce water ingress.

FIG. 1 is a cross-sectional view of bearing device 100 with full surface treatment to reduce water ingress.

Figure 2:
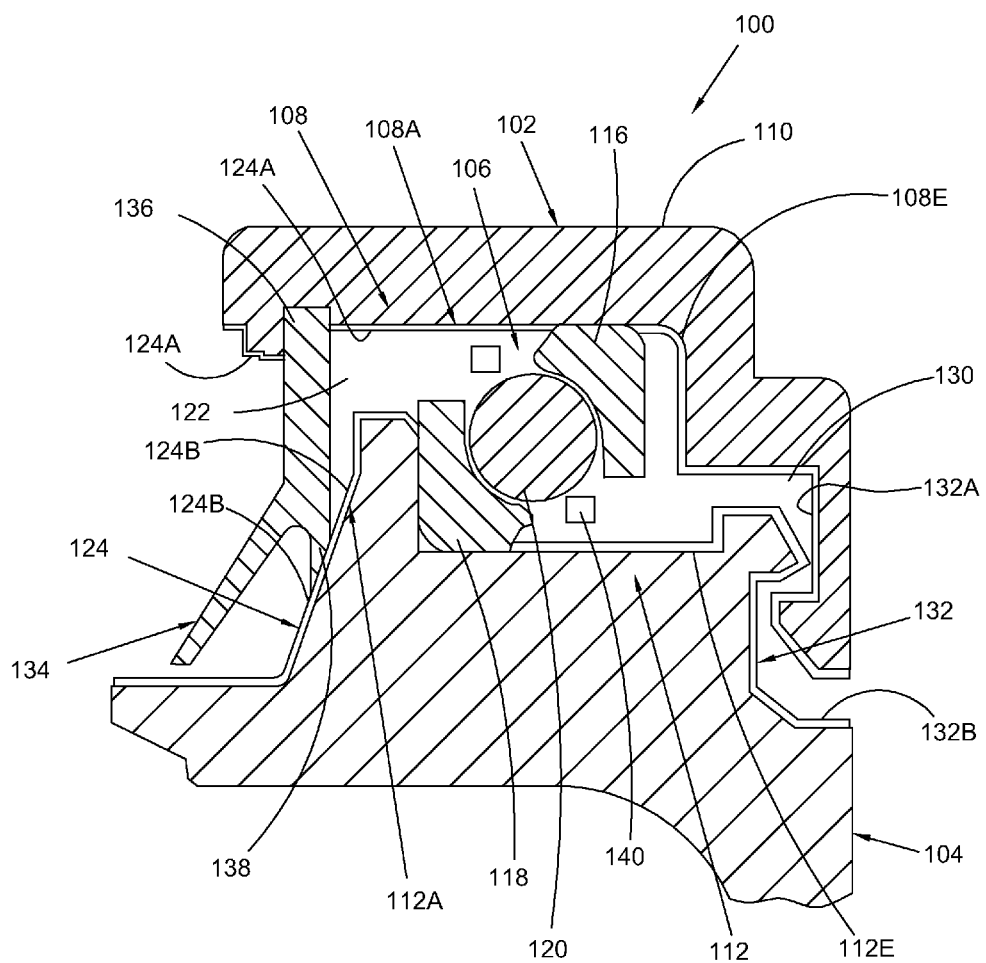
FIG. 2 is a cross-sectional view of a bearing device with a seal and full surface treatment to reduce water ingress.

FIG. 2 is a cross-sectional view of bearing device 100 with a seal and full surface treatment to reduce water ingress. The following should be viewed in light of FIGS. 1 and 2. Bearing device 100 includes housings 102 and 104 and bearing assembly 106. Housing 102 includes interior surface 108 and exterior surface 110. Housing 104 includes interior surface 112 and exterior surface 114. Bearing assembly 106 includes rings 116 and 118 and at least one rolling element 120 disposed between and at least partially retained by rings 116 and 118. Ring 116 is connected surface 108 and ring 118 is connected to surface 112.

Device 100 includes space 122 between portions 108A and 112A of surfaces 108 and 112, respectively. Space 122 extends from exterior surfaces 110 and 114 to the bearing assembly. Device 100 includes at least one of layer 124 of a hydrophobic material. Layer 124A of the hydrophobic material is adhered to and covers some or all of portion 108A. Layer 124B of the hydrophobic material is adhered to and covers some or all of portion 112A. The hydrophobic material can be any hydrophobic material known in the art.

In the example embodiment of FIG. 1, layer 124A covers the entirety of portion 108A. In the example embodiment of FIG. 2, layer 124B covers the entirety of portion 112A.

Figure 3:
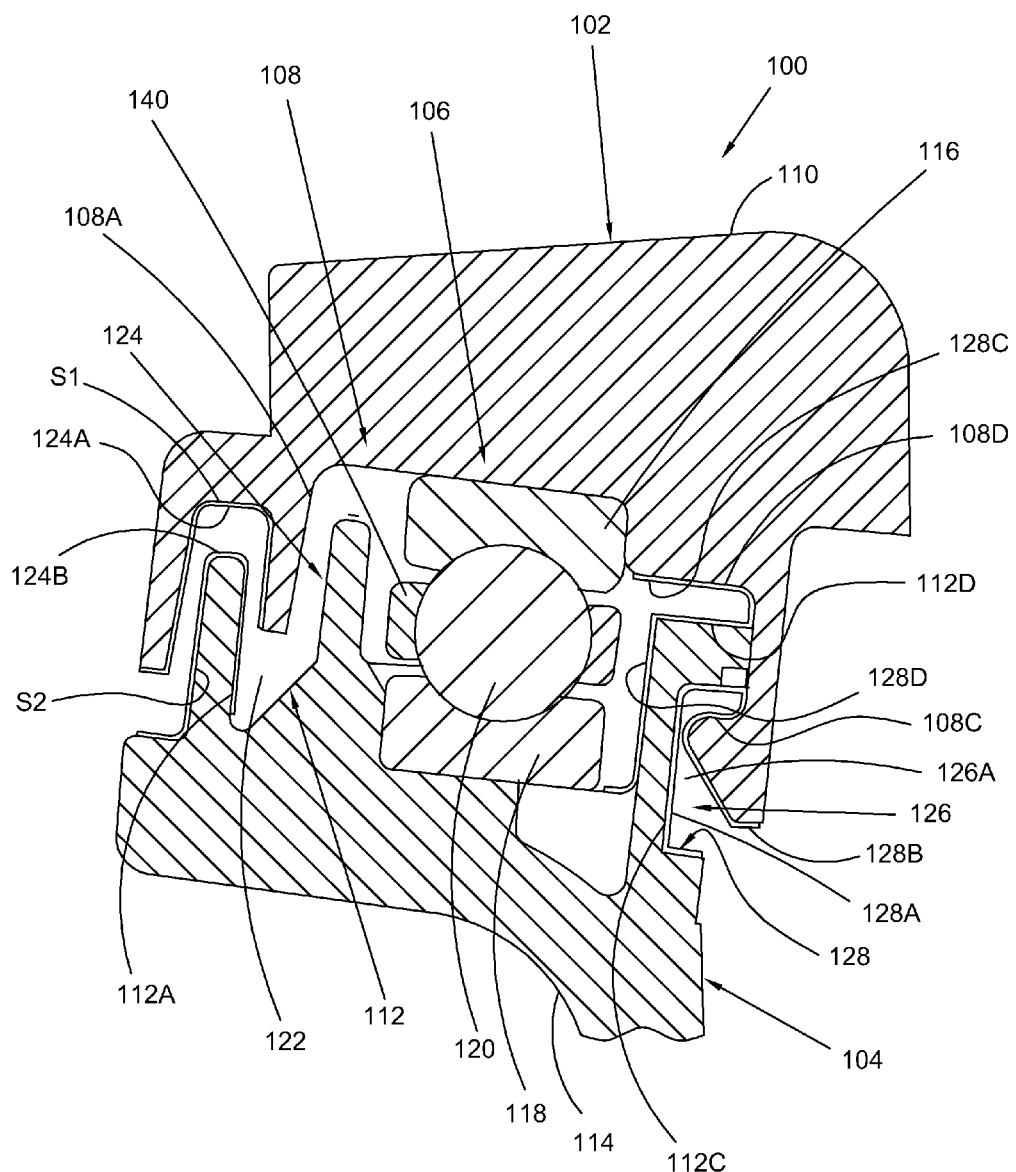
FIG. 3 is a cross-sectional view of the bearing device in FIG. 1 with less extensive surface treatment to reduce water ingress.

FIG. 3 is a cross-sectional view of bearing device 100 in FIG. 1 with less extensive surface treatment to reduce water ingress.

Figure 4:
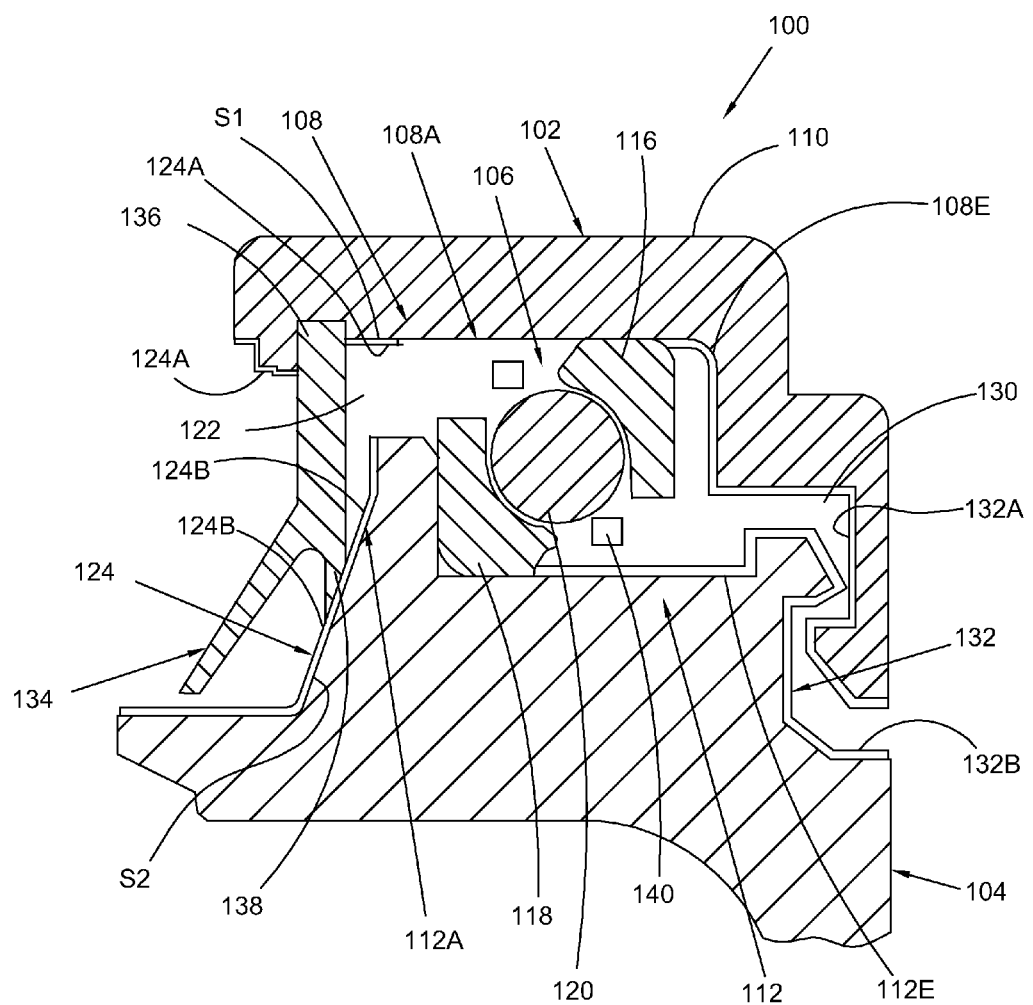
FIG. 4 is a cross-sectional view of the bearing device in FIG. 2 with less extensive surface treatment to reduce water ingress.

FIG. 4 is a cross-sectional view of bearing device 100 in FIG. 2 with less extensive surface treatment to reduce water ingress. In the example embodiment of FIG. 3, layer 124A covers only segment S1 of portion 108A and layer 124B covers only segment S2 of portion 112A. In the example embodiment of FIG. 4, layer 124A covers only segment S1 of portion 108A and layer 124B covers only segment S2 of portion 112A. Segment S1 includes less than the entirety of portion 108A and segment S2 includes less than the entirety of portion 112A. It should be understood that the respective extents and positions of segments S1 and S2 can differ from those shown in FIGS. 3 and 4.

Figure 5:
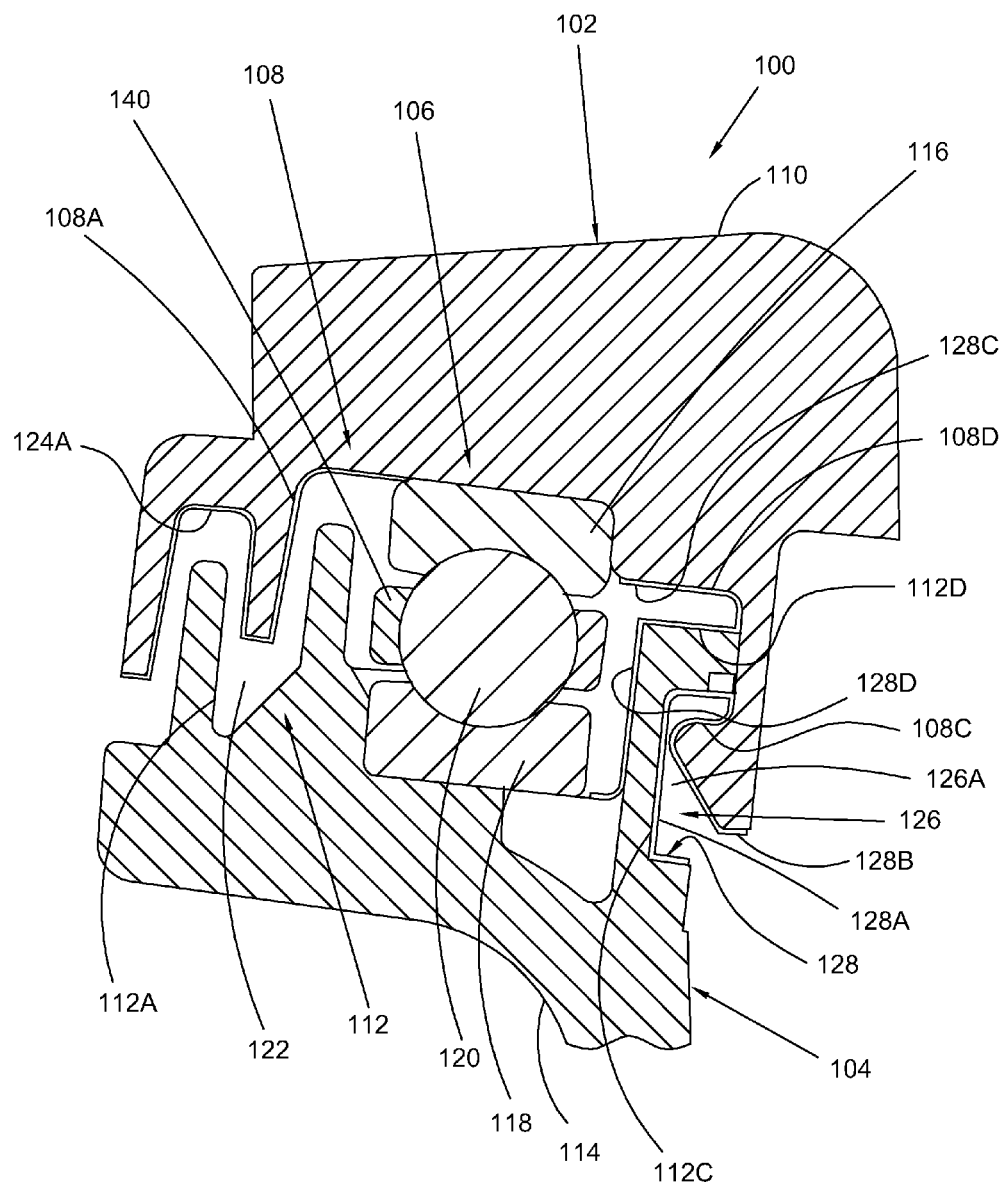
FIG. 5 is a cross-sectional view of the bearing device in FIG. 1 with surface treatment on only one housing to reduce water ingress.

FIG. 5 is a cross-sectional view of bearing device 100 in FIG. 1 with surface treatment on only one housing to reduce water ingress.

Figure 6:
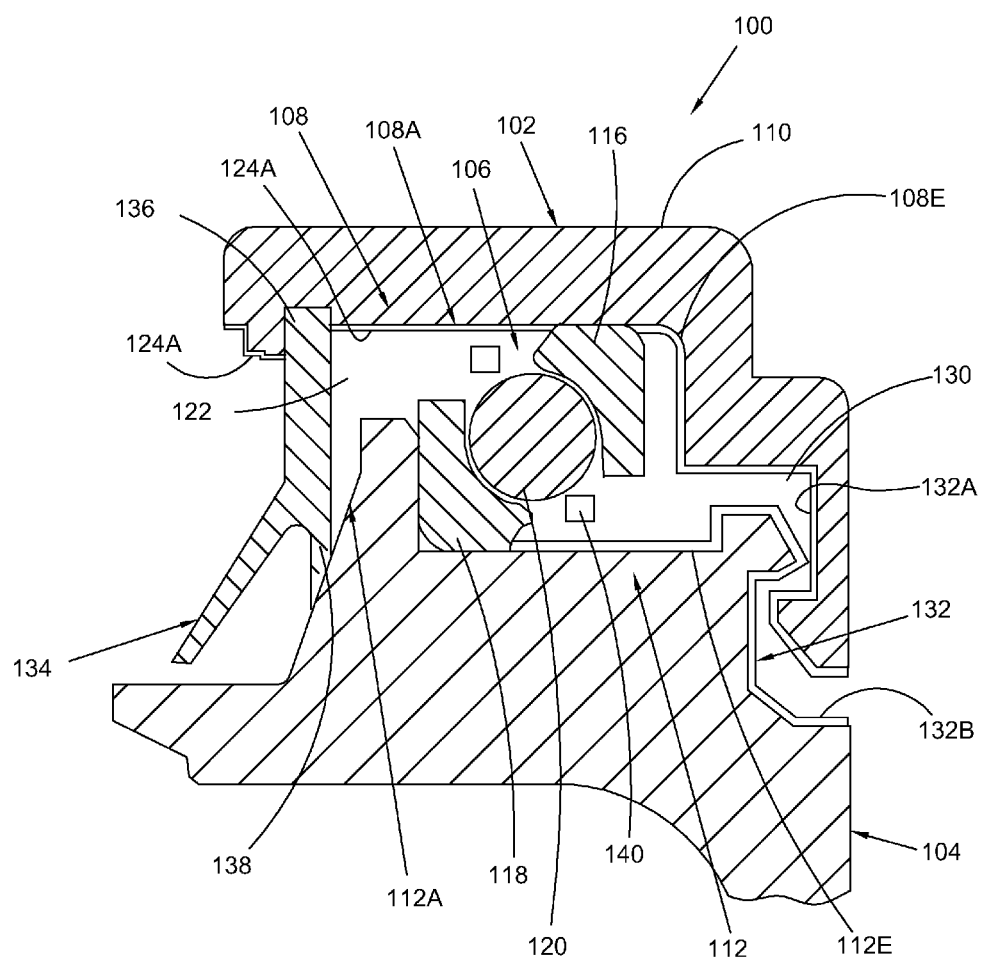
FIG. 6 is a cross-sectional view of the bearing device in FIG. 1 with surface treatment on only one housing to reduce water ingress.

FIG. 6 is a cross-sectional view of bearing device 100 in FIG. 1 with surface treatment on only one housing to reduce water ingress. In the example embodiment of FIG. 5, layer 124A covers portion 108A and there is no layer of hydrophobic material on portion 112A. In the example embodiment of FIG. 6, layer 124A covers portion 108A and there is no layer of hydrophobic material on portion 112A.

Figure 7:
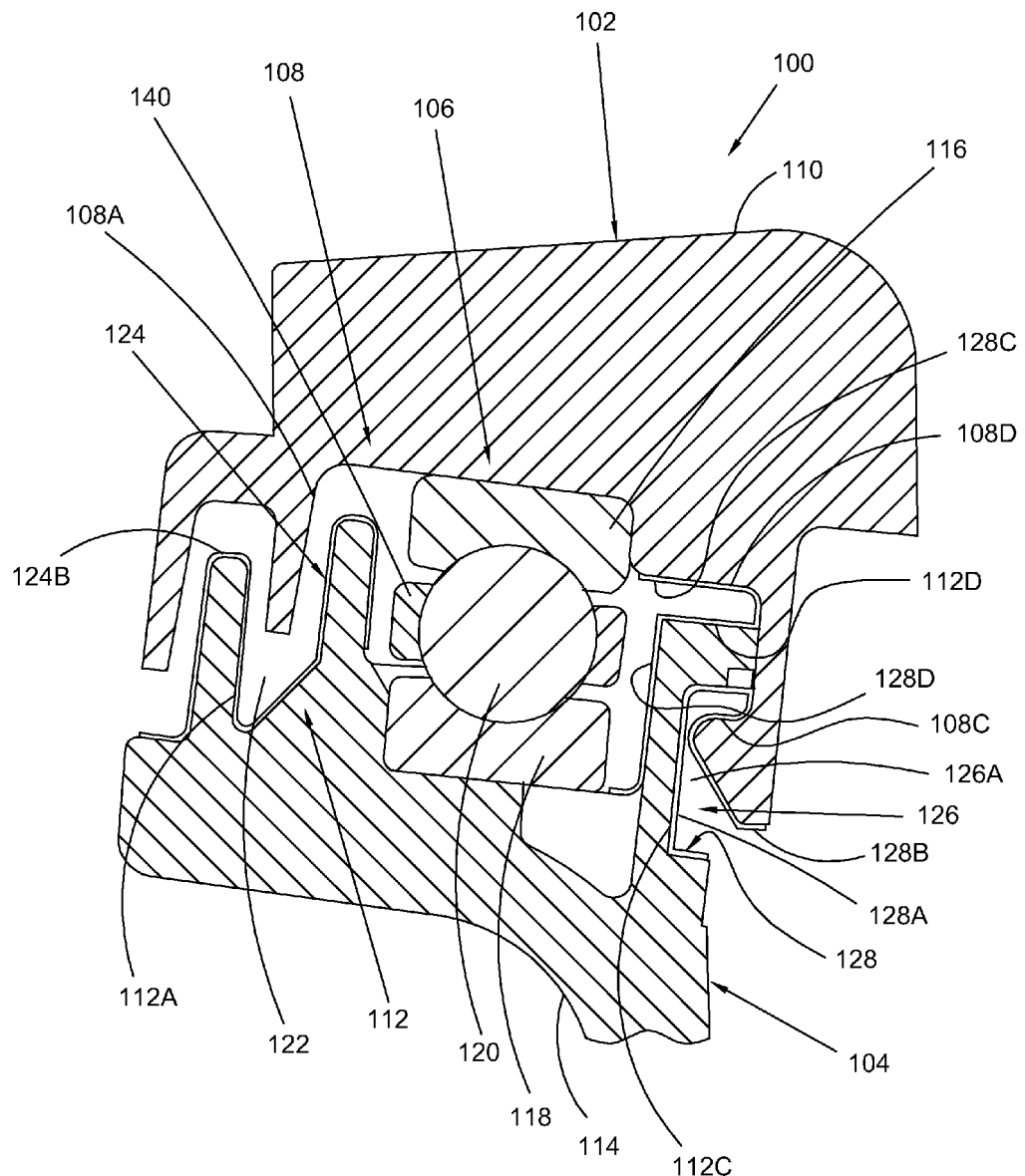
FIG. 7 is a cross-sectional view of the bearing device in FIG. 2 with surface treatment on only one housing to reduce water ingress.

FIG. 7 is a cross-sectional view of bearing device 100 in FIG. 1 with surface treatment on only one housing to reduce water ingress.

Figure 8:
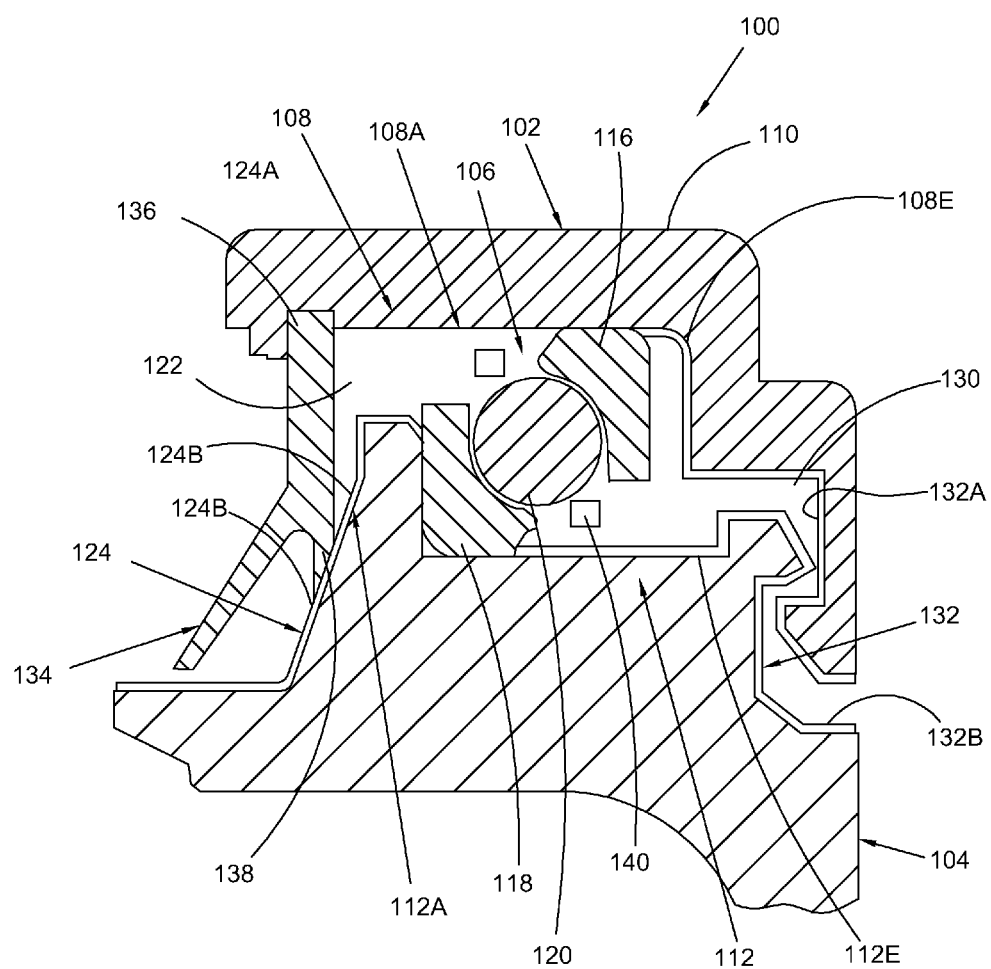
FIG. 8 is a cross-sectional view of the bearing device in FIG. 2 with surface treatment on only one housing to reduce water ingress.
Figure 9:
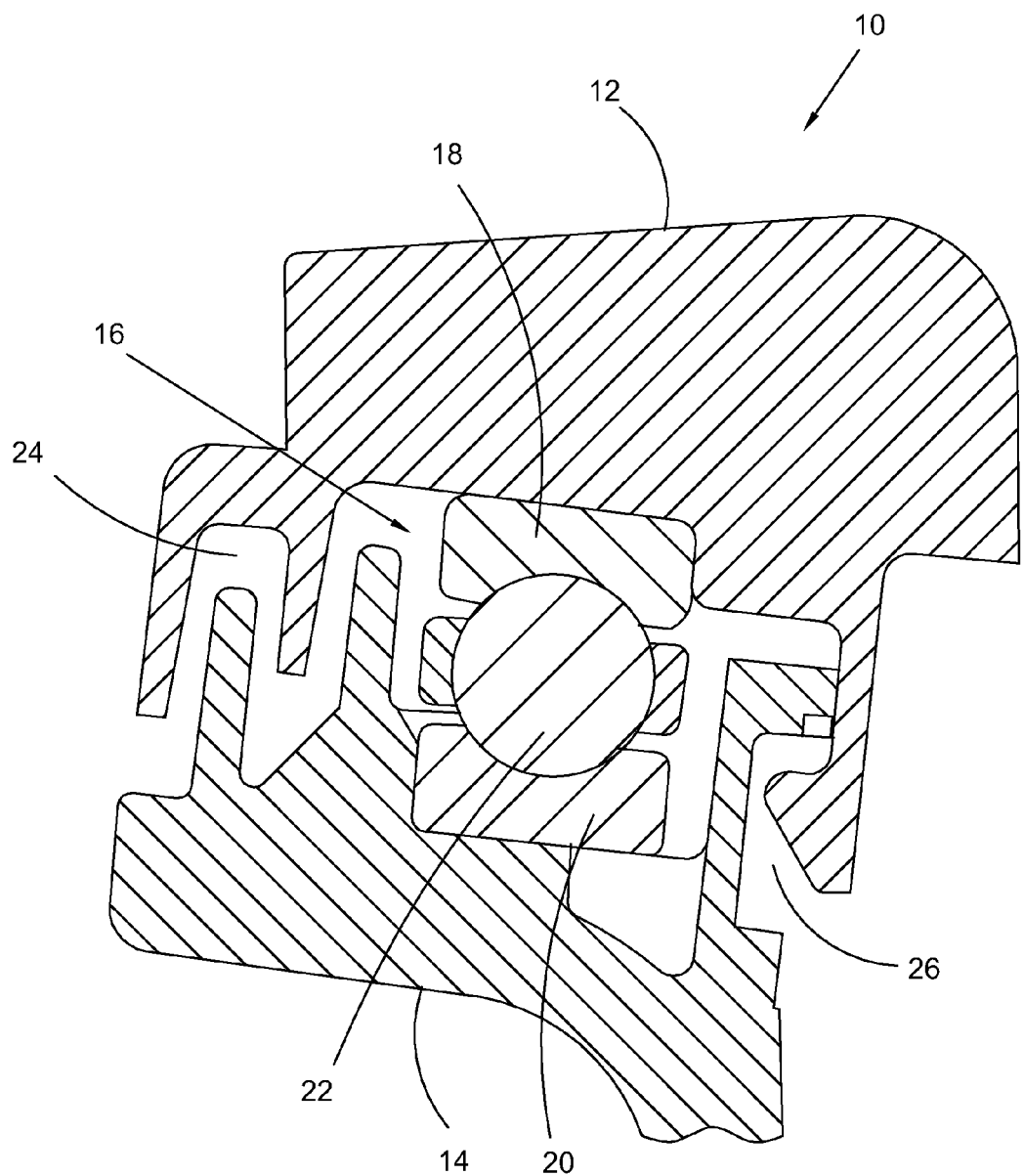
FIG. 9 is a cross-sectional view of a prior art bearing device.
Figure 10:
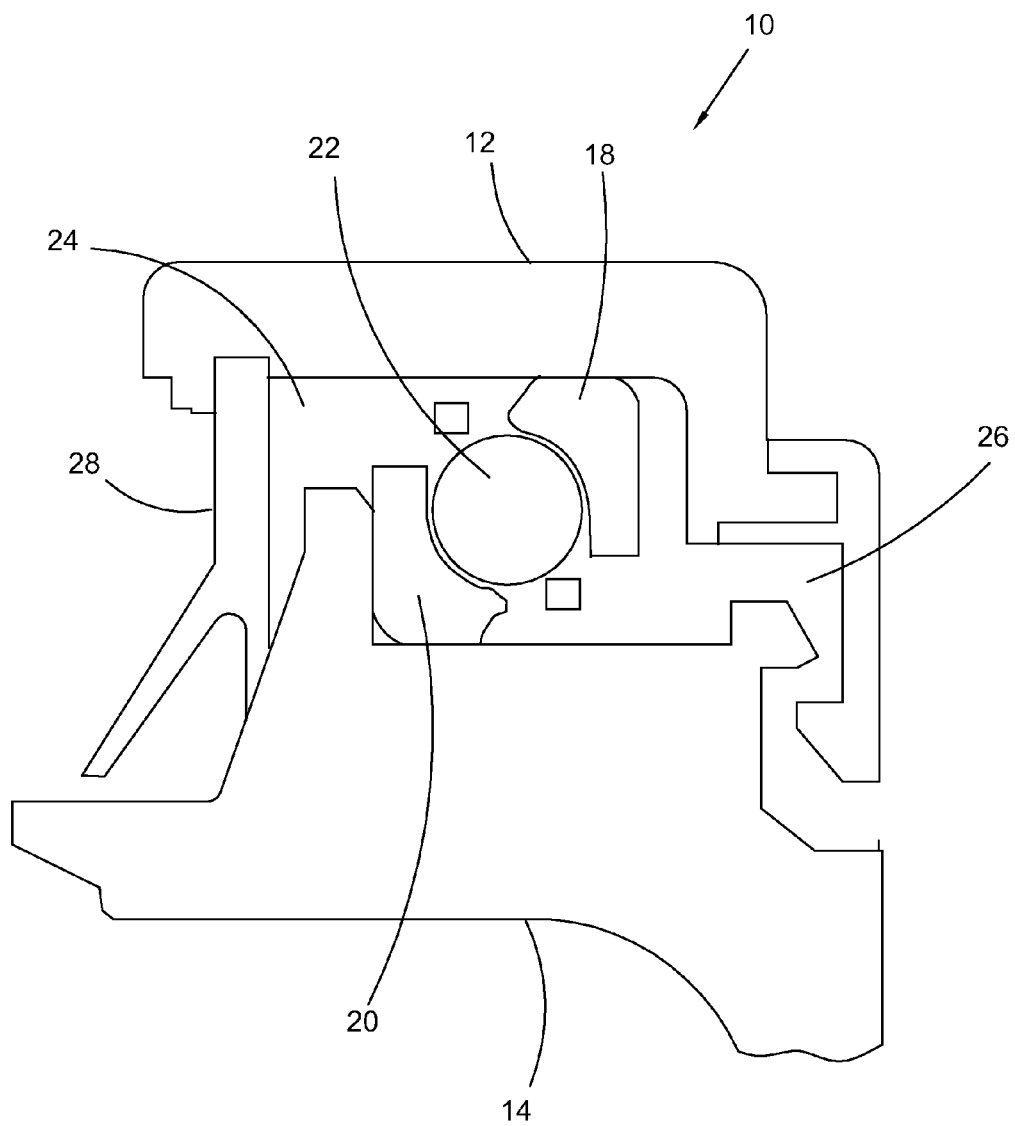
FIG. 10 is a cross-sectional view of a prior art bearing device.

FIG. 8 is a cross-sectional view of bearing device 100 in FIG. 1 with surface treatment on only one housing to reduce water ingress. In the example embodiment of FIG. 7, layer 124B covers portion 112A and there is no layer of hydrophobic material on portion 108A. In the example embodiment of FIG. 8, layer 124B covers portion 112A and there is no layer of hydrophobic material on portion 108A.

It should be understood that the configurations of layers 124A and 124B shown in FIGS. 3 through 8 can be combined to form configurations not shown in the figures. For example: housing 102 in FIG. 3 can be combined with housing 104 in FIG. 7; housing 104 in FIG. 3 can be combined with housing 102 in FIG. 5; housing 102 in FIG. 4 can be combined with housing 104 in FIG. 8; and housing 104 in FIG. 3 can be combined with housing 102 in FIG. 6.

In the respective example embodiments of FIGS. 1, 3, 5, and 7, device 100 includes spaces 126A and 126B, separate from space 122. Spaces 126A and 126B are between surfaces 108 and 112. More specifically, space 126A is between portions 108C and 112C of surfaces 108 and 112C, respectively. More specifically, space 126B is between portions 108D and 112D of surfaces 108 and 112C, respectively. Spaces 126A and 126B are between exterior surfaces 110 and 114, and bearing assembly 106.

In the respective example embodiments of FIGS. 1, 3, 5, and 7, device 100 includes at least one of layer 128 of a hydrophobic material. In an example embodiment, layer 128A of the hydrophobic material is adhered to and covering some or all of portion 112C. In an example embodiment, layer 128B of the hydrophobic material is adhered to and covering some or all of portion 108C. In an example embodiment, layer 128C of the hydrophobic material is adhered to and covering some or all of portion 108D. In an example embodiment, layer 128D of the hydrophobic material is adhered to and covering some or all of portion 112D.

In the respective example embodiments of FIGS. 2, 4, 6, and 8, device 100 includes space 130, separate from space 122. Space 130 is between portions 108E and 112E of surfaces 108 and 112, respectively. Space 130 is between exterior surfaces 110 and 114, and bearing assembly 106.

In the respective example embodiments of FIGS. 2, 4, 6, and 8, device 100 includes at least one of layer 132 of a hydrophobic material. In an example embodiment, layer 132A of the hydrophobic material is adhered to and covering some or all of portion 108E. In an example embodiment, layer 132B of the hydrophobic material is adhered to and covering some or all of portion 112E.

In the example embodiments of FIGS. 2, 4, 6, and 8, device 100 includes seal 134 at least partially located in space 122 and sealed against portions housings 102 and 104. Specifically ends 136 and 138 of seal 134 are sealed against housings 102 and 104, respectively. In an example embodiment, seal 134 is sealed against one or both of layers 124A and 124B. In an example embodiment, seal 134 is sealed against one or both of portions 108A and 112A, that is, one or both of layers 124A and 124B are not disposed between the seal and portions 108A and 112A, respectively.

In an example embodiment, one or both of housings 102 and 104 are made of structural plastic, for example, nylon.

In an example embodiment, assembly 106 includes bearing cage 140.

The following should be viewed in light of FIGS. 1 through 8. The following describes a method for proofing a bearing device against ingress of water. Although the method is presented as a sequence of steps for clarity, no order should be inferred from the sequence unless explicitly stated. A first step coats at least a first portion of a first interior surface of a first housing for the bearing device with a first layer of a hydrophobic material. A second step coats at least a second portion of a second interior surface of a second housing for the bearing device with a second layer of the hydrophobic material. A third step fixedly connects first and second rings for a bearing assembly to the first and second interior surfaces, respectively, the first and second rings partially retaining at least one rolling element. A fourth step creates a first space between the first and second interior surfaces, the first space between an exterior of the bearing device and the bearing assembly and at least partially bounded by the first and second portions. The first segment includes less than an entirety of the first portion and the second segment includes less than an entirety of the second portion.

In an example embodiment: a fifth step coats a third portion of the first interior surface, different from the first portion, with a third layer of the hydrophobic material; a sixth step coats a fourth portion of the second interior surface, different from the second portion, with a fourth layer of the hydrophobic material; and a seventh step creates at least one second space, different from the first space, between the first and second interior surfaces, the second space between the exterior of the bearing device and the bearing assembly and at least partially bounded by the third and fourth portions. The third segment includes less than an entirety of the third portion and the fourth segment includes less than an entirety of the fourth portion.

In an example embodiment, fixedly connecting the first and second rings for the bearing assembly to the first and second interior surfaces, respectively, includes fixedly connecting the first and second rings so that a straight line passes through, in order, the first housing, the first space, the second housing, the first space, and the bearing assembly.

In an example embodiment, creating the first space includes creating: a first end of the first space opening to the exterior of the bearing device; and a second end of the first space facing the bearing assembly. An eighth step installs a seal in the first space between the first and second ends. A ninth step seals the seal against the first and second housings.

In an example embodiment: the first portion is between the bearing assembly and the exterior; the second portion is between the bearing assembly and the exterior; and the first and second segments are less than all of the first and second portions, respectively. A tenth step:

for the first portion, coats only the first segment, or for the second portion, coats only the second segment; or, for the first portion, coats only the first segment, and for the second portion, coats only the second segment; or, coats substantially all of the first portion, or coats substantially all of the second portion; or, coats substantially all of the first portion, and coats substantially all of the second portion; or, coats the first portion, and for the second portion, coats only the second segment; or, coats the second portion, and for the first portion, coats only the first segment.

Advantageously, bearing device 100, in particular, layers 124, 126, and 132 address and resolve the problems note above regarding ingress of water into a bearing device. Layers 124, 126, and 132 cause water contacting the layers to bead upon the layers. When the water beads, the water is less likely to travel further along the layers, thus limiting or eliminating ingress of the water into device 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A bearing device, comprising:
   a first housing including:
      a first interior surface with a first portion; and,
      a first exterior surface;
   a second housing including:
      a second interior surface with a second portion; and,
      a second exterior surface;
   a bearing assembly including:
      a first ring connected to the first interior surface;
      a second ring connected to the second interior surface; and,
      at least one rolling element disposed between and at least partially retained by the first and second rings;
   a first space:
      between the first and second portions of the first and second interior surfaces, respectively; and,
      extending from the first and second exterior surfaces to the bearing assembly; and,
   at least one first layer of a hydrophobic material adhered to and covering:
      substantially all of the first portion; and,
      substantially all of the second portion.

2. The bearing device of claim 1, wherein:
   for the first portion, the at least one first layer adheres to and covers only a first segment of the first portion, wherein the first segment includes less than an entirety of the first portion; and,
   for the second portion, the at least one first layer adheres to and covers only a second segment of the second portion, wherein the second segment includes less than an entirety of the second portion.

3. The bearing device of claim 1, wherein:
   the at least one first layer adheres to and covers the first portion; and,
   for the second portion, the at least one first layer adheres to and covers only a second segment of the second portion, wherein the second segment includes less than an entirety of the second portion.

4. The bearing device of claim 1, wherein:
   the at least one first layer adheres to and covers the second portion; and,
   for the first portion, the at least one first layer adheres to and covers only a first segment of the first portion, wherein the first segment includes less than an entirety of the first portion.

5. The bearing device of claim 1, wherein the first and second surfaces include third and fourth portions, respectively, different from the first and second portions, respectively, the bearing device further comprising:
  at least one second space, separate from the first space:
    between the third and fourth surfaces; and,
    between the first and second exterior surfaces and the bearing assembly; and,
  at least one second layer of the hydrophobic material adhered to and covering at least one of:
    a third segment of the at least one third portion; or,
    a fourth segment of the at least one fourth surface, wherein:
      the third segment includes less than an entirety of the third portion; and,
      the fourth segment includes less than an entirety of the fourth portion.

6. The bearing device of claim 1, wherein the first space includes:
  a seal:
    at least partially located in the first space; and,
    sealed against the first and second housings.

7. A bearing device, comprising:
  a first housing including:
    a first interior surface with a first portion; and,
    a first exterior surface;
  a second housing including:
    a second interior surface with a second portion; and,
    a second exterior surface;
  a bearing assembly including:
    a first ring connected to the first surface;
    a second ring connected to the second surface; and,
    at least one rolling element disposed between and at least partially retained by the first and second rings;
  a first space:
    between first and second portions of the first and second surfaces, respectively;
  and,
    extending from the first and second exterior surfaces to the bearing assembly; and,
  at least one first layer of a hydrophobic material adhered to and covering at least:
    substantially all of the first portion; and,
    substantially all of the second portion,
  wherein:
    a first straight line passes through, in order, the first housing, the first space, the second housing, the first space, and the bearing assembly; or,
    the device further comprises:
      a seal:
        at least partially located in the first space; and,
        sealed against the first and second housings.

8. The bearing device of claim 7, wherein the first and second surfaces include third and fourth portions, respectively, different from the first and second portions, respectively, the bearing device further comprising:
  at least one second space, separate from the first space:
    between the third and fourth surfaces; and,
    between the first and second exterior surfaces and the bearing assembly; and,
  at least one second layer of the hydrophobic material adhered to and covering at least one of:
    a third segment of the at least one third portion; or,
    a fourth segment of the at least one fourth surface, wherein:
      the third segment includes less than an entirety of the third portion; and,
      the fourth segment includes less than an entirety of the fourth portion.

9. The bearing device of claim 7, wherein:
  the at least one first layer adheres to and covers the first portion; and,
  for the second portion, the at least one first layer adheres to and covers only a second segment of the second portion, wherein the second segment includes less than an entirety of the second portion.

10. The bearing device of claim 7, wherein:
  the at least one first layer adheres to and covers the second portion; and,
  for the first portion, the at least one first layer adheres to and covers only a first segment of the first portion, wherein the first segment includes less than an entirety of the first portion.

11. A method of proofing a bearing device against ingress of water, comprising:
  coating at least a first portion of a first interior surface of a first housing for the bearing device with a first layer of a hydrophobic material;
  coating at least a second portion of a second interior surface of a second housing for the bearing device with a second layer of the hydrophobic material;
  fixedly connecting first and second rings for a bearing assembly to the first and second interior surfaces, respectively, the first and second rings partially retaining at least one rolling element; and,
  creating a first space between the first and second interior surfaces, the first space between an exterior of the bearing device and the bearing assembly and at least partially bounded by the first and second portions, wherein:
    the first segment includes less than an entirety of the first portion; and,
    the second segment includes less than an entirety of the second portion.

12. The method of claim 11, further comprising:
  coating a third portion of the first interior surface, different from the first portion, with a third layer of the hydrophobic material;
  coating a fourth portion of the second interior surface, different from the second portion, with a fourth layer of the hydrophobic material; and,
  creating at least one second space, different from the first space, between the first and second interior surfaces, the second space between the exterior of the bearing device and the bearing assembly and at least partially bounded by the third and fourth portions, wherein:
    the third segment includes less than an entirety of the third portion; and,
    the fourth segment includes less than an entirety of the fourth portion.

13. The method of claim 11, wherein fixedly connecting the first and second rings for the bearing assembly to the first and second interior surfaces, respectively, includes fixedly connecting the first and second rings so that a straight line passes through, in order, the first housing, the first space, the second housing, the first space, and the bearing assembly.

14. The method of claim 11, wherein creating the first space includes creating:
  a first end of the first space opening to the exterior of the bearing device; and,
  a second end of the first space facing the bearing assembly, the method further comprising:
    installing a seal in the first space between the first and second ends; and,
    sealing the seal against the first and second housings.

15. The method of claim 11, wherein:
the first portion is between the bearing assembly and the exterior;
the second portion is between the bearing assembly and the exterior; and,
the first and second segments are less than all of the first and second portions, respectively, the method further comprising:
  for the first portion, coating only the first segment, or for the second portion, coating only the second segment; or,
  for the first portion, coating only the first segment, and for the second portion, coating only the second segment; or,
  coating substantially all of the first portion, or coating substantially all of the second portion; or,
  coating substantially all of the first portion, and coating substantially all of the second portion; or,
  coating the first portion, and for the second portion, coating only the second segment; or,
  coating the second portion, and for the first portion, coating only the first segment.

\* \* \* \* \*